No. 831,501. PATENTED SEPT. 18, 1906.
H. M. DICKINSON.
CANDY PULLING MACHINE.
APPLICATION FILED NOV. 5, 1901.

Witnesses
Inventor
By
H. M. Dickinson
Assoc. Atty.

UNITED STATES PATENT OFFICE.

HERBERT M. DICKINSON, OF GRAND RAPIDS, MICHIGAN, ASSIGNOR, BY MESNE ASSIGNMENTS, TO HERBERT L. HILDRETH, OF BOSTON, MASSACHUSETTS.

CANDY-PULLING MACHINE.

No. 831,501.     Specification of Letters Patent.     Patented Sept. 18, 1906.

Application filed November 5, 1901. Serial No. 81,277.

*To all whom it may concern:*

Be it known that I, HERBERT M. DICKINSON, a citizen of the United States, residing at Grand Rapids, in the county of Kent and State of Michigan, have invented new and useful Improvements in Candy-Pulling Machines, of which the following is a specification.

This application refers to a machine designed for the pulling of candy, and is adapted to mechanically pull candy so as to produce the same or better results than are usually produced by hand-pulling.

The invention consists in combining with a trough or suitable receptacle for supporting the candy to be operated upon pins or hooks adapted to travel within the said receptacle and to be shifted in the course of their travel so as to pull all portions of the candy placed within the receptacle; also, to combine with a series of pin or hooks suitable means for operating the same, substantially as hereinafter described.

The objects of my invention are, first, to provide a machine which mechanically pulls candy in order to produce the same result as hand-pulling and in a better degree; second, to facilitate and cheapen the process of pulling candy; third, to furnish a machine for operation on the candy which will produce a superior article. These objects I accomplish by means of the structure particularly shown and illustrated in the accompanying drawings, in which—

Figure 1:
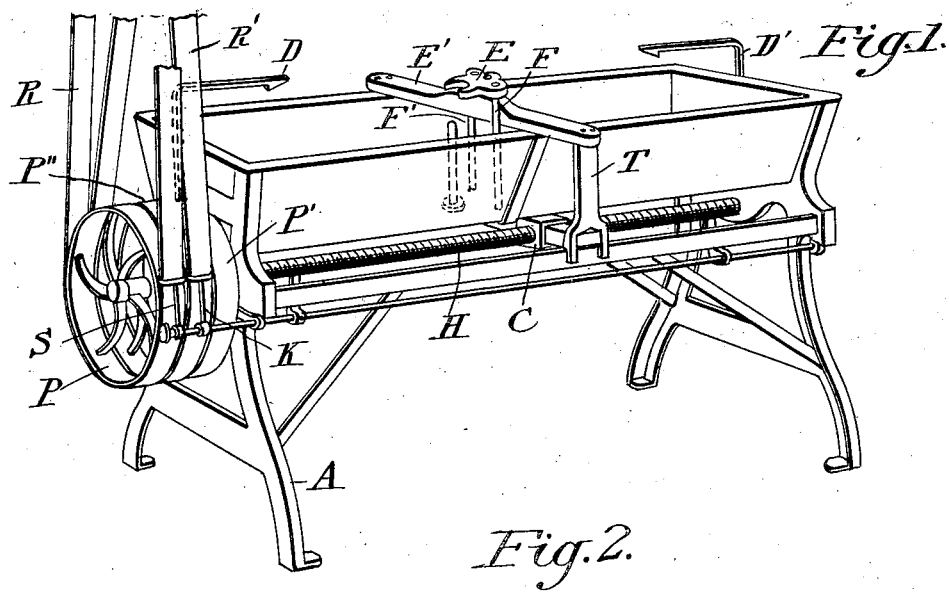
Figure 2:
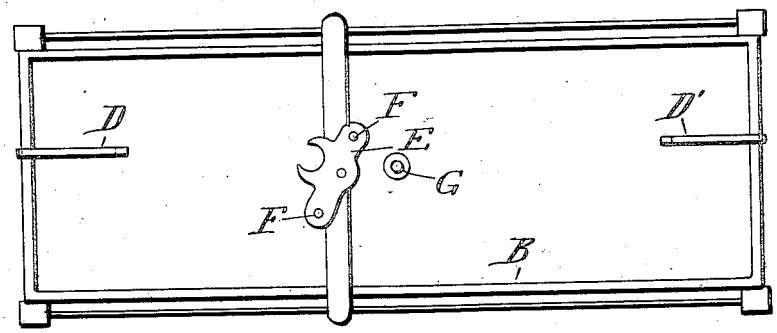
Figure 3:
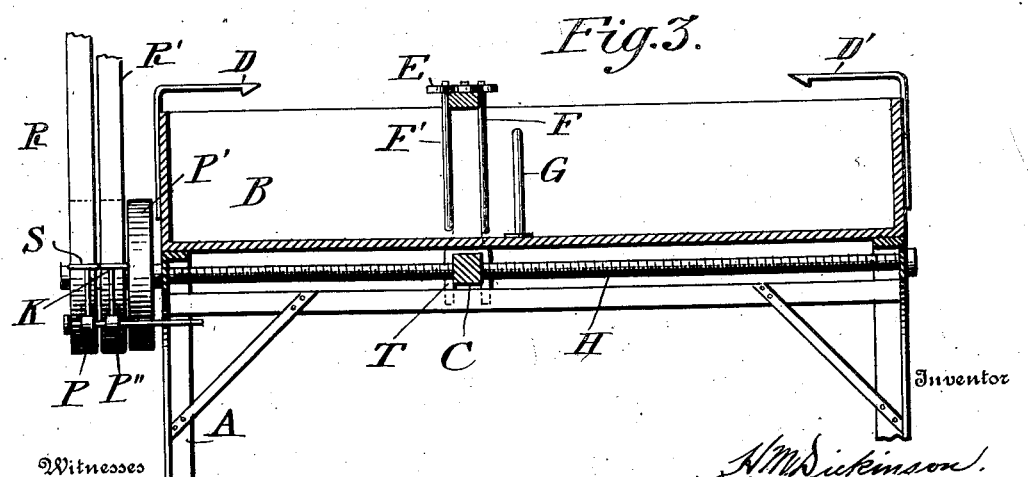

Figure 1 shows a perspective view of a machine constructed in accordance with my invention. Fig. 2 shows a plan view of the trough or candy-support with the operating pins or hooks and trips in position. Fig. 3 shows a vertical longitudinal section of the machine.

A shows a framework, of any suitable material or form, for supporting the trough and operating mechanism.

B shows the trough or receptacle supported on the framework, which said trough or receptacle may be made in any suitable form, the object of said trough being merely to receive and support the batch of candy to be operated upon.

C shows the screw-threaded nut, which engages with a reciprocating slide T for the purpose of giving a reciprocating motion of said slide and the movable pins or hooks.

D and D' are stops, one at each end of the candy-receptacle, and are adapted to change the position of the pins F and F' when brought in contact with the said stops, as hereinafter described.

E is the arm on the plate E', which supports the pins F and F'.

F and F' are pins carried by the plate E' and are adapted to be turned when the arm E comes in contact with D or D'.

G is the stationary pin which, in the example of my invention shown in the drawings, is secured to the bottom of the candy-receptacle B.

P and P' are idler-pulleys on an extension of the screw-shaft H.

P'' is a band-pulley attached rigidly to the extension of said screw-shaft H.

R and R' are bands operated by any suitable machinery. (Not shown in the drawings.)

S is the shifting device for shifting the band R, and K is a shifting device for shifting the band R', the band R' being crossed so as to give the reverse motion to the screw-shaft H when said band is shifted upon the stationary pulley P''.

T is a framework provided with a screw-threaded nut C, engaging with the screw-thread on H. The frame T supports the plate E' and also the pins F and F'.

The operation of my invention is as follows: When the band R' is acting upon the band-pulley P'', the screw-shaft H is turned in proper direction to convey the frame T to the right, as shown in the drawings, until the arm E comes in contact with the stationary stop D', thereby shifting the positions of the pins or hooks F and F' in the candy. At this point a band R' is moved onto the idler-pulley and the band R upon the stationary pulley P'' and the motion of the frame T is reversed until the arm E comes in contact with the stationary trip D, again reversing the positions of the pins F and F' or, in other words, returning them to normal positions. Thus the frame T, with the parts thereto attached, is given a reciprocating motion through the batch of candy supported by the receptacle B.

I have illustrated and described band-pulleys and a screw-threaded shaft as the means for operating the candy-hooks within the receptacle which holds the batch of candy; but any other suitable means may be used. I have also shown in the drawings a trough for supporting the candy; but any suitable support may be used which has the capacity for supporting the candy while it is being operated upon, as hereinbefore described. I have also illustrated and described a stationary hook or pin and two traveling shifting pins; but I do not wish to be understood as limiting my invention to such an arrangement, since my invention could be applied in a device where the candy-hook moves back and forth and where the pins or hooks, although having a shifting action, are relatively stationary. In either case the candy is acted upon in a manner and by means of the shifting hook along a path corresponding to what I term a figure "8." I have also used the terms "pins" and "hooks"—that is, I have made use of them merely for the purpose of description—and while these terms were found in the claims I desire to have them construed as embracing any form of device to perform the functions given by said pins or hooks.

Believing myself, as I do, to be the first to invent a machine for pulling candy comprising a hook and two shifting pins, I desire to claim the same in the broadest possible legal manner.

Having thus described my invention and its method of operation, I have not attempted to set forth all the forms in which it may be embodied; but

What I claim is—

1. A candy-pulling machine comprising a plurality of oppositely-disposed candy hooks or supports, a candy-puller, and means for producing a specified relative in-and-out motion of these parts for the purpose set forth.

2. In a candy-pulling machine the combination of a stationary candy-pin, a set of candy-hooks and means for moving and shifting one of said hooks in relation to the other, substantially as described.

3. In combination with a stationary candy-pin, a pair of candy-hooks, a suitable frame for giving a reciprocating motion to the said candy-hooks, a shifting piece carrying said candy-hooks, and suitable means for shifting the position of such candy-hooks at or near the end of each stroke, substantially as described.

4. In combination with a candy-receptacle, a reciprocating frame, a shifting piece carried by the reciprocating frame, candy-hooks carried by said shifting piece, a stationary candy-pin within the said receptacle, trips for shifting said shifting piece as it is reciprocated from end to end of the candy-receptacle, and suitable means for giving the reciprocating motion to the sliding frame and the shifting piece, substantially as described.

5. In combination with a candy-receptacle a stationary pin therein, a reciprocating sliding frame, a shifting piece carried by the sliding frame, a trip-arm upon said shifting piece, a stationary trip at either end of the said candy-receptacle, said stationary trips adapted to turn the shifting piece upon its pivot and thereby shifting the candy-hooks carried thereby, substantially as described.

6. In a candy-pulling machine, the combination of means for stretching or pulling the candy, and means for lapping the stretched candy upon itself.

7. In a candy-pulling machine the combination of means for stretching or pulling the candy, means for lapping the stretched candy, and means for moving said stretching and lapping means in intersecting paths.

8. In a candy-pulling machine the combination of means for stretching or pulling the candy, means for lapping the stretched candy, and means for producing a relative in-and-out motion of said stretching and lapping means.

9. A candy-pulling machine having candy-pulling members and means for moving said members in intersecting paths, whereby the said members automatically feed and pull the candy.

10. In a candy-pulling machine, in combination, a series of pins or candy-pulling members, and means for moving a part of said members in intersecting paths, whereby the said members automatically feed and pull the candy.

11. In a candy-pulling machine, in combination, a series of more than two pins or pulling members, and automatically-acting means for causing said members to feed the candy to each other and pull the same.

12. In a candy-pulling machine, the combination of a series of more than two pins or candy carrying and pulling members, and mechanism for moving said members relative to one another in such a manner as to carry the strands of candy produced by one movement of said members and hold the same across the path of motion to be followed by another of said members in its further movement.

13. In a candy-pulling machine, the combination of a series of more than two pins or candy carrying and pulling members, and mechanism for moving a part of said members relatively to others of said members in such a manner as to produce a strand of candy and carry and hold the same in a position to be intersected by another of said members in the further relative movement thereof.

14. In a candy-pulling machine, the combination of a pulling member, a plurality of coöperating pins or hooks, and mechanism for producing relative movement between said member and pins or hooks relatively to one another in a manner to automatically feed the candy to each other and pull the same.

15. In a candy-pulling machine, in combination, a series of more than two candy carrying and pulling members, means for increasing the distance between one and another of such members and for returning the same to their original relative positions, and means for carrying the strand of candy produced by one moving member to a position across the path of motion to be followed by another moving member.

16. In a candy-pulling machine, the combination of a plurality of candy carrying and pulling members, and mechanism for moving said members toward and from each other and alternately therewith varying their relative positions so as to carry the strands of candy produced by one movement of said members to a position across the path of motion to be followed by one of said members in the further movement thereof.

17. In a candy-pulling machine, the combination of a plurality of oppositely-disposed candy-pulling members, and automatically-acting mechanism for moving said members alternately away from and toward each other and alternately therewith changing the relative positions of some of said members.

18. In a candy-pulling machine, the combination of oppositely-disposed pulling members, one of which carries a plurality of pins or hooks, and mechanism for alternately increasing and decreasing the distance between said members and for shifting said pins relatively to each other during the movements of said members.

19. In a candy-pulling machine, the combination of a stationary pulling member, a plurality of movable pulling members, and mechanism for moving said movable members relatively to the stationary member and to each other, whereby the said members automatically feed and pull the candy.

20. In a candy-pulling machine, the combination of an oscillating arm carrying a pair of candy-pulling members, a coöperating pulling member and mechanism for causing relative rectilinear movements of said arm and last-named member, and for alternately therewith imparting oscillatory movement to said arm.

In testimony whereof I have hereunto set my hand in presence of two subscribing witnesses.

HERBERT M. DICKINSON.

Witnesses:
C. H. BURDICK,
H. A. BURDICK.